Dec. 29, 1942.   C. C. CHAMBERS   2,306,936
PROCESS AND APPARATUS FOR FLASHING IN HALF-TONE
Filed March 26, 1940
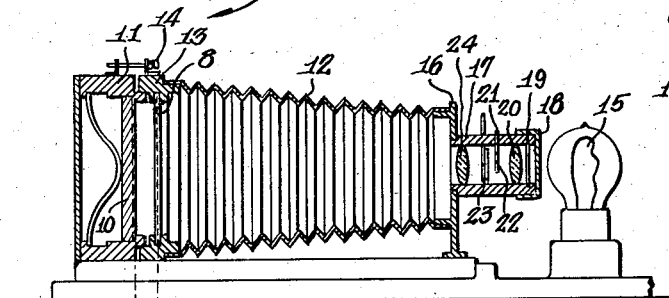
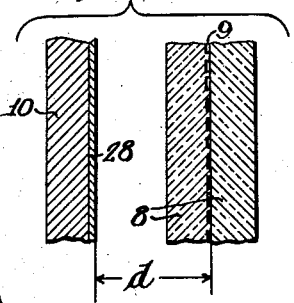
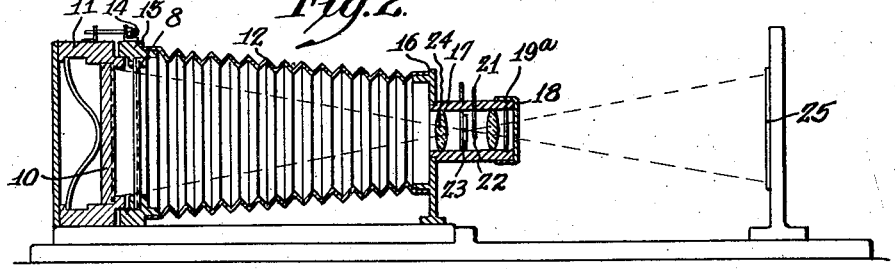
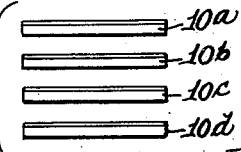
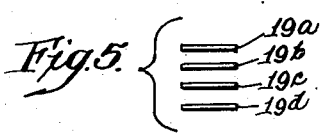
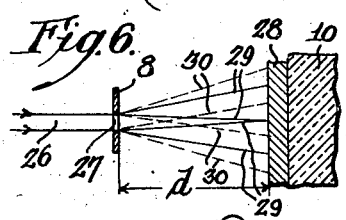
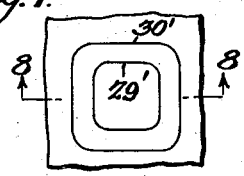
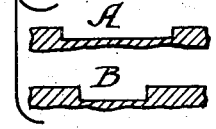
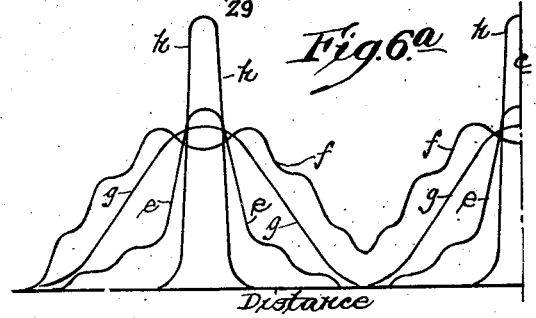
Inventor
Carl C. Chambers.
by
Attorneys Patented Dec. 29, 1942

2,306,936

UNITED STATES PATENT OFFICE 2,306,936

PROCESS AND APPARATUS FOR FLASHING IN HALF TONE

Carl C. Chambers, Lansdowne, Pa., assignor to Edward Stern & Company, Incorporated, Philadelphia, Pa., a corporation of Pennsylvania Application March 26, 1940, Serial No. 326,011

12 Claims. (Cl. 95—5)

The present invention relates to photography and particularly to one of the steps in producing half-tone photographs for subsequent reproduction, as on a printing plate, by contact printing or otherwise and for color or non-color printing.

The half-tone photograph is taken in step exposures of a photographic medium sensitive within and outside of the blue end of the spectrum, preferably of a panchromatically sensitive film and often an orthochromatically sensitive film, through a conventional half-tone screen. One of the steps is the so-called flash exposure of the film through the half-tone screen under intense light, the light entering the camera preferably at a pin hole opening and acting upon the light-sensitive film in dot areas exposed by the screen openings. The flash exposure serves as a conditioner for the photo-sensitive material, exposing it to a point normally insufficient to produce a dot large enough to print on the printing plate, but sufficient to accentuate the effect of other exposures. In the past the step of flashing a screen-covered panchromatically sensitive film has for non-color printing been with white light and for color printing has been either with white light or with light of the color intended to be printed from the photograph.

A purpose of the present invention is to half-tone flash a panchromatically sensitive film for non-color printing with monochromatic light, as distinguished from light of mixed wave lengths.

A further purpose is to flash the film with short-wave monochromatic light, for example blue light.

A further purpose is to lessen light diffraction beyond the half-tone screen openings, thereby lessening the size of dots produced by flashing through a given screen.

A further purpose is to secure, by flashing, dots that individually are very intense at the center with progressive decreasing intensity from near the center outward.

In color photography the flash exposure as well as other exposures have been commonly made through blue, red, green, and yellow filters for plates intended respectively to print yellow, blue-green, magenta and black and in taking these flash exposures the half-tone screen has with the different colored filters had to be located at different distances from the light-sensitive films—each color flashing requiring a specific focus between the half-tone screen and light-sensitive film.

A further purpose is to avoid the need for focus adjustments of the half-tone screen when flashing a succession of plates for color printing.

A further purpose is to space the screen from successive plates for color printing for flashing with a specific monochromatic light, spacing the screen for best focus of this one kind of light—preferably blue light, and to flash all plates for printing for example in different colors, with this one type light—thereby attaining best focus not attainable at a single spacing for different monochromatic lights.

A further purpose is to flash, with blue or other short wave monochromatic light, photographs in which the rest of the exposure is made with red or other relatively long wave monochromatic light.

Further purposes appear in the specification and in the claims.

The drawing is largely diagrammatic.

Figure 1 is a diagrammatic sectional elevation intended to illustrate the step of flashing a film sensitive within and outside of the blue end of the spectrum through a conventional half-tone screen.

Figure 2 is a view corresponding to Figure 1 but modified for the succeeding steps of the photographing process.

Figure 3 is an enlarged separated fragment of Figure 1 showing the film and screen arrangement.

Figures 4 and 5 show respectively a succession of films and corresponding succession of differently colored light filters for successive photoprocessing in the layout of Figure 2 for color work.

Figure 6 is a diagrammatic view illustrating in great exaggeration the passage of white light through a half-tone screen opening—and the light diffraction beyond the screen opening, with a resultant tendency of the screen to focus portions of the light.

Figure 6a is a diagrammatic view showing plots of light intensity against the distance from dot center and the intensity being due to flash exposures—showing hypothetical plots respectively for blue light, screen focused on the light-sensitive plate; for red light, screen focused for blue light; for white light focused for white light; and a plot of the hypothetically desired intensity.

Figure 7 is a diagrammatic dot from the light passage of Figure 6.

Figure 8 in great exaggeration indicates dots on a printing plate from flashing with respectively different kinds of light, reinforced by further exposure by light from the copy over the same area as the flash exposure dot, to show, side by side, dots from flashing through the same screen opening respectively with white light and blue light.

Like numerals refer to like parts in all figures.

Describing in illustration and not in limitation and referring to the drawing:

The photo-sensitive surface is described as a photographic medium or a film herein, whether it be stiff or resilient, and therefore whether it would be ordinarily described as a plate or a film.

When reference is made herein to a dot produced by flash exposure, it should be remembered that the flash exposure dot ordinarily is effective only in its conditioning action on the film, and does not print.

The invention is applicable to the making of a half-tone photograph of whatever character. If the half-tone photograph be produced directly from the copy, it will be a negative, and the printing plate will ordinarily be made from this half-tone negative. If the half-tone photograph be produced directly from a continuous-tone negative, the half-tone photograph may be produced directly on the half-tone printing plate, which will take the place of the negative in the case first mentioned. The production of a half-tone negative from the copy is the more usual case, and this will be treated unless otherwise stated, although it will be understood that the same principles may be applied in producing the half-tone plate from a continuous-tone negative. Of course, if desired, where the copy is a negative, a half-tone positive may be made on photographic film or a photographic plate, and not directly on the printing plate.

In the existing process of half-tone photographing on a photographic medium sensitive within and outside of the blue end of the spectrum, such as a panchromatically sensitive film back of a suitable half-tone screen, there are normally a number of step exposures, of which the flash exposure is one step, being a step independent of the copy (object to be photographed).

The other exposures, made with successively larger camera apertures, may include the so-called detail and highlight exposures. Where there are to be in all four exposures, the exposures additional to the flash exposure may be the shadow exposure, the middle-tone exposure and the high-light exposure. These are dependent on the copy. It is immaterial whether the flash exposure be made before or after the other exposures.

The present invention is concerned with the flash exposure and, where the half-tone plate is made directly from a half-tone negative, indirectly improves the final half-tone plate by changing the character of the very small dots photographed on the half-tone negative during the flash exposure. If the half-tone photograph is made directly on the printing plate, the improvement is direct and not through the agency of the half-tone negative. If the half-tone photograph is a half-tone negative, my invention secures a greater intensity of shadow detail and conversely, if the half-tone photograph is a half-tone positive or the half-tone printing plate itself, the invention secures a greater intensity of high light detail.

To illustrate the advantage of a small flash-exposure dot, let us consider a solid black region of the copy as compared with the next adjacent tone in the scale of grays. Where the copy is a solid black there must be no dot made on the plate. The flash exposure, as in usual practice, conditions the photo-sensitive material but does not expose it sufficiently to make a printed dot. As the smallest individual exposure area obtainable in the process is that from the flash exposure, the next tone to this solid black which can be reproduced, can have a white dot no smaller than the approximate top of the flash exposure cone. If the flash exposure produces a large cone, there will be an abrupt change in the scale of grays between the solid black and the next adjacent reproducible tone. In order to avoid this abrupt change, no solid blacks are printed in the best printing and the blackest tone that is reproduced is that whose dot is of the size of the approximate top of the flash exposure cone. Thus the flash exposure determines the limit of blackness in the picture.

Figure 1 illustrates conventionally the half-tone flashing of a panchromatically light-sensitive film, suitably an orthochromatic film, with monochromatic light.

As shown, a conventional half-tone screen 8 and a conventional light-sensitive film or plate 10 are supported in the plate holder end 11 of a conventional camera 12, with the screen 8 held independently of and spaced from the light-sensitive plate presenting conventional openings (rulings) 9 in front of the light-sensitive plate. The distance of the screen 8 from the film or plate 10 is desirably made adjustable as by mounting the screen in a slidable frame 13 adjusted by a thumb-screw 14.

The camera is directed toward a uniform source 15 of light, suitably white light of high uniform intensity as usual in flashing. In the front 16 of the camera a removable head 17 presents toward the light sequentially a cap 18 functioning as a shutter, a color filter 19 which passes only monochromatic light, a lens 20, a pinhole diaphragm 21 movable in a slot 22 into and out of the central operative position, an open adjustable iris 23 and a lens 24. The half-tone screen 8 and film 10 are thus positioned for half-tone flashing from the light source 15 to the photographic film 10.

During the half-tone flash exposure, the iris 23 is open wide enough so as not to obstruct the pinhole. The lenses 20 and 24 are preferably left in place as they are substantially without effect since the lens curvature at the center within the range of the pinhole is very small.

In the half-tone flash exposure, the shutter 18 is opened for the required period in the usual way, passing only monochromatic light through the filter 19, the pinhole in the diaphragm 21, the length of the camera 12, through the half-tone screen 8 at the rulings 9 to effect the half-tone dotting of the film 10.

The present invention is concerned particularly with carrying out the half-tone flash exposure operations with a standard monochromatic light and particularly with short wave monochromatic light, for example with blue light, violet light, ultra-violet light or a mixture of the same, desirably obtained by filtering white light through the requisite filter. The filter 19 will ordinarily be a blue filter.

After completing half-tone flashing, or optionally before half-tone flashing, the further operations may be as indicated in Figure 2, with the camera directed toward the copy 25 (the object to be photographed in half-tone) as for printing in color or noncolor—here presumed to be for printing in color.

With the set up of Figure 2, the so-called detail and high-light exposures of the photographic film or plate, or the so-called shadow, middle-tone and high-light exposures, may be made, usually with successively greater apertures, as will be well understood by those skilled in the art.

If the half-tone photograph is to be for non-color or so-called black-and-white printing, the light filter 19a of Figure 2 will be omitted and the half-tone photographing process may be accomplished with a single half-tone photograph 10 using light including a plurality of wave lengths.

If the operation is for color printing, as many half-tone photographs will be required as there are to be printing plates for printing in respectively different colors. For example, there may be three or more half-tone printing plates required, each half-tone plate for printing a color different from that to be printed by each of the others. It is here assumed there are to be four printing plates and four films or plates 10a, 10b, 10c, and 10d. I half-tone flash-expose the films or plates 10a, 10b, 10c, and 10d preferably exactly alike, as already described, with monochromatic light, preferably short wave light, as obtained by a filter 19 of blue glass. But I make the detail and high-light exposures (or the shadow, middle-tone and high-light exposure) with the camera directed to the copy and for each film or plate 10a, 10b, 10c, and 10d use a different color filter 19a, 19b, 19c or 19d that filters out colors that are to be printed by the printing plate in question.

I locate the screen 8 at a specific optical distance d (Figures 1, 3 and 6) from the light sensitive surface of the successive plates, this distance d, suitably determined experimentally, being that for best flashing with a specific monochromatic light—as for best flashing with blue light—and generally much less suited for flashing with light materially different from the selected light.

The great improvement in half-tone photographs when half-tone flash exposing is carried out with monochromatic and preferably short wave light as distinguished from half-tone flash exposing with white light appears to be due both to the ability to flash with a known light that is predeterminedly the one light right for focusing intense dots on the light sensitive plate in passing through the specific screen at the specific optical distance d from the plates; and to the lesser diffraction of the short wave, giving smaller dots for a given screen.

This is indicated in great exaggeration in Figures 6 to 8.

In Figure 6 a pencil of rays 26 of white light in passing an opening 27 of a half-tone screen 8 to fall upon a film or plate 10 carrying a light sensitive coating 28, is diffracted by the edge of the opening and spreads outwardly and inwardly after passing the opening, the degree of spreading being determined by the wave length of the light. The short wave length light at or toward the blue end of the spectrum spreads less than the relatively long wave length of light at or toward the red end of the spectrum. The pencil of diffracted rays of blue light is indicated at 29, and that for red light is shown at 30, in each case some of the rays being deflected outward and others inward. As indicated the inwardly directed shorter wave rays 29 are focusing on the light-sensitive coating 28, while the red rays are altogether out of focus.

The plots of Figure 6a illustrate roughly how light intensities at the plate surface during flashing vary from one dot center to the next and for different light conditions.

In flash exposure it is desirable to make the center of each dot a region of maximum intensity—to produce a small shadow dot, not sufficiently large to cause printing, even upon the darkest portion of the picture.

If we change the color of the flash exposure from a red light through green light to blue light we should also change the optical distance d between the screen and plate—in that the focus distance for a given screen will be progressively different for the different kinds of light. In each case the distance d needs to be that for greatest intensity at the dot center.

In the case of blue light focused on the plate, the plot of intensity at the plate surface, from dot center to dot center, may be about as indicated by plot e. The plot f indicates roughly the intensity for red light with the distance d right for blue light focus, and the plots g and h respectively are white light and a hypothetical desirable curve most nearly approached by e. A plot for red light in focus would be generally similar to that for blue light but flatter and wider.

In the case of white light it is impossible to focus for a small dot, and with a given screen and plate it is in general not possible to obtain with focused red light as small dots as with focused blue light—and also in general it is not possible to obtain as small dots with unfocused blue light as with a focused monochromatic light—for example as with a focused blue light. I believe myself to be the first to flash all the plates for color printing with a single monochromatic light focused on the successive plates—in that they are all at the same optical distance from the screen.

The resultant dots, if reinforced by further exposure by light from the copy over the same area, as the flash exposure dots, may show up on the printing plate somewhat as indicated (greatly exaggerated) at Figures 7 and 8. It will be understood that the size of the dot is not rigidly fixed, particularly if the flash exposure does not cause a small intense core, the size then depending upon small non-controllable factors.

The limit of outward diffraction of blue light is shown at 28' in Figure 7, and that for red light is shown at 30'.

Figure 8 shows the various types of dots produced by flashing with different kinds of light reduced by further exposure over the same area. A dot thus produced by flashing with white light as in the prior art, may be as indicated at A, Figure 8, while one produced by flashing with blue light may be as indicated at B. It will be understood that in dots flashed with white light, the sizes are much more likely to be irregular than in dots flashed with light of short wave length. With blue light the dot is much smaller than with white light and in general smaller than when flashed with red or other monochromatic light.

The smaller the dot, and the greater the intensity of the dot, the greater the ability to reproduce shadow detail in the half-tone negative or the greater the ability to reproduce high-light detail in the half-tone positive. Experimental results obtained from the present invention indicate that by following the procedure of the invention the shadow detail or high-light detail, as the case may be, in the final print made from the half-tone plate, is improved about 20% over the results obtained in previous processes, where flashing was accomplished by means of white light.

The best results from the invention will be obtained when monochromatic light at the blue or short wave end of the spectrum is used in the flash exposure, since this will produce the smallest dots. Much of the advantage can be obtained, however, by flash exposing using monochromatic light of longer wave length, such as green, provided the screen is placed at a distance for focusing the green or other longer wave length light upon the successive plates.

Where reference is made to the half-tone printing plate, it is intended to include any suitable form of printing plate, whether known in the trade as a plate, matrix, or by any other similar designation.

It will naturally be understood that interposing a filter between the source of white light and the photographic film during flashing will cut down the intensity of the light. Accordingly the time of flash exposure will be increased, where necessary, to compensate for the decreased intensity of the source, or a more powerful source of white light will be used. The blue filter is intended to illustrate one means of obtaining light at the blue end of the spectrum, and it will be understood that any suitable source of blue, violet or ultra-violet light may be employed, not necessarily a source of white light with an interposed blue filter. For example, the lamp 15 may be a blue lamp, in which case the filter 19 will be optional.

The invention is applicable to any photographic medium which is sensitive more or less generally throughout the spectrum, that is, sensitive within and outside of the blue end of the spectrum. Such a film or plate is commonly referred to as panchromatically sensitive, notwithstanding that its sensitivity may not be uniform throughout the spectrum. Where the photographic medium is panchromatically sensitive, but with increased sensitivity at the blue end of the spectrum and reduced sensitivity at the red end as compared to what is known commercially as a panchromatic film, and with pronounced sensitivity in the green, it is called orthochromatic in the trade.

Where reference is made herein to a half-tone screen, it is intended to designate the conventional type of grille screen which interrupts the light but focuses it only in so far as a focus is obtained with a pin hole camera. The invention is particularly applicable to fine screen work.

In view of my invention and disclosure variations and modifications to meet individual whim or particular need will doubtless become evident to others skilled in the art, to obtain all or part of the benefits of my invention without copying the process and structure shown, and I, therefore, claim all such in so far as they fall within the reasonable spirit and scope of my invention.

Having thus described my invention, what I claim as new and desire to secure by Letters Patent is:

1. The process of producing a black and white half-tone photograph from copy not limited to neutral tones, where the photograph is the entire result rather than one of a set of color separation photographs, which comprises flashing a panchromatically light-sensitive photographic medium through a half-tone screen by means of light of wave length at least as short as blue light, and making the larger aperture exposures of the copy not limited to neutral tones through the half-tone screen by a mixture of light of the various colors, the steps being performed in any desired order.

2. The process of producing a black and white half-tone photograph from copy not limited to neutral tones, where the photograph is the entire result rather than one of a set of color separation photographs, which comprises flashing a panchromatically light-sensitive photographic medium through a half-tone screen spaced for a particular wave length of monochromatic light by means of monochromatic light of said wave length, and making the larger aperture exposures of the copy not limited to neutral tones through the half-tone screen by light including a plurality of wave lengths, the steps being performed in any desired order.

3. The process of producing a black and white half-tone photograph from copy not limited to neutral tones, where the photograph is the entire result rather than one of a set of color separation photographs, which comprises flashing a panchromatically light-sensitive photographic medium through a half-tone screen by means of monochromatic light and making the larger aperture exposures of the copy not limited to neutral tones through the half-tone screen by a mixture of light of various colors, the steps being performed in any desired order.

4. The process of producing a black and white half-tone photograph from copy not limited to neutral tones, where the photograph is the entire result rather than one of a set of color separation photographs, which comprises flashing a panchromatically light-sensitive photographic medium through a half-tone screen spaced for blue light by means of blue light, and making the larger aperture exposures of the copy not limited to neutral tones through the half-tone screen by light including a plurality of wave lengths, the steps being performed in any desired order.

5. The process of producing a black and white half-tone photograph from copy not limited to neutral tones, where the photograph is the entire result rather than one of a set of color separation photographs, which comprises filtering light including a plurality of wave lengths through a filter which will pass only light of wave length at least as short as blue light, with such filtered light flashing a panchromatically light-sensitive photographic medium through a half-tone screen spaced for the filtered light, and making the larger aperture exposures of the copy not limited to neutral tones through the half-tone screen by light including a plurality of wave lengths.

6. The process of half-tone color photography, which comprises flashing at least one of the longer wave length plates of a set of color separation plates for a particular copy on a panchromatically light-sensitive photographic medium through a half-tone screen spaced for light of wave length at least as short as blue light by means of light of said short wave length, and making the larger aperture exposures through the half-tone screen with the color of light appropriate to the particular plate, the steps being performed in any desired order.

7. The process of half-tone color photography, which comprises flashing at least one of the longer wave length plates of a set of color separation plates for a particular copy on a panchromatically light-sensitive photographic medium through a half-tone screen spaced for blue light by means of blue light, and making the larger aperture exposures through the half-tone screen with the color of light appropriate to the particular plate, the steps being performed in any desired order.

8. The process of half-tone color photography, which comprises flashing the red plate of a set of color separation plates for a particular copy on a panchromatically light-sensitive photographic medium through a half-tone screen spaced for light of wave length at least as short as blue light by means of light of said short wave length, and making the larger aperture exposures through the half-tone screen with red light, the steps being performed in any desired order.

9. The process of half-tone color photography, which comprises filtering light including a plurality of wave lengths through a filter which will pass only light of wave length at least as short as blue light and with such filtered light flashing all of a set of color separation plates for a particular copy on panchromatically light-sensitive photographic media through a half-tone screen spaced for the filtered light, and making the larger aperture exposures of the various plates through the half-tone screen with different colors of light for the different plates, the steps being performed in any desired order.

10. The process of producing a black and white half-tone photograph from copy not limited to neutral tones, where the photograph is the entire result rather than one of a set of color separation photographs, which comprises flashing a panchromatically light-sensitive photographic medium through a half-tone screen spaced for light of wave length at least as short as blue light by means of light of said short wave length, and making the larger aperture exposures of the copy not limited to neutral tones through the half-tone screen by light including a plurality of wave lengths, the steps being performed in any desired order.

11. The process of half-tone color photography, which comprises flashing all of the different color plates for a particular copy on panchromatically light-sensitive photographic media through a half-tone screen spaced in all cases for monochromatic light of wave length at least as short as blue light, by means of monochromatic light of said short wave length and making the larger aperture exposures of the various plates through the half-tone screen with different colors of light for the different plates, the steps being performed in any desired order.

12. The process of half-tone color photography, which comprises flashing all of a group of color plates for a particular copy on panchromatically light-sensitive photographic media through a half-tone screen spaced for blue light by means of blue light and making the larger aperture exposures of the various plates through the half-tone screen with different colors of light for the different plates, the steps being performed in any desired order.

CARL C. CHAMBERS.